(12) United States Patent
Field et al.

(10) Patent No.: US 9,612,993 B2
(45) Date of Patent: Apr. 4, 2017

(54) DYNAMICALLY CONFIGURABLE ANALOG FRONTEND CIRCUITRY

(71) Applicant: Intel Corporation, Santa Clara, CA (US)

(72) Inventors: Ryan M Field, Sunnyvale, CA (US); Wen-Ling M Huang, Los Altos, CA (US); Hao Luo, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/318,635

(22) Filed: Jun. 28, 2014

(65) Prior Publication Data

US 2015/0378954 A1 Dec. 31, 2015

(51) Int. Cl.
*G06F 13/12* (2006.01)
*G06F 13/38* (2006.01)
*G06F 13/42* (2006.01)
*G06F 1/26* (2006.01)

(52) U.S. Cl.
CPC .......... *G06F 13/4221* (2013.01); *G06F 1/266* (2013.01)

(58) Field of Classification Search
None
See application file for complete search history.

(56) References Cited

U.S. PATENT DOCUMENTS

| | | | |
|---|---|---|---|
| 7,411,533 B2 | 8/2008 | Posamentier | |
| 8,223,219 B2 | 7/2012 | Hatano | |
| 8,766,939 B2 | 7/2014 | Sobel et al. | |
| 2003/0063219 A1 | 4/2003 | Bellers | |
| 2003/0081694 A1* | 5/2003 | Wieck | H03G 1/0088 375/316 |
| 2008/0106448 A1 | 5/2008 | Harper | |
| 2009/0326859 A1 | 12/2009 | Hammerschmidt et al. | |
| 2013/0194445 A1* | 8/2013 | Brown | H04N 5/378 348/222.1 |
| 2013/0222335 A1* | 8/2013 | Lee | G11C 27/024 345/174 |
| 2014/0040706 A1* | 2/2014 | Wu | H04L 1/0041 714/776 |

(Continued)

FOREIGN PATENT DOCUMENTS

WO  2013052642 A9  6/2014

OTHER PUBLICATIONS

International Search Report and Written Opinion for PCT Patent Application No. PCT/US2015/037996, Mailed Sep. 18, 2015, 11 pages.

(Continued)

*Primary Examiner* — David E Martinez
(74) *Attorney, Agent, or Firm* — Compass IP Law (57) ABSTRACT

An analog frontend (AFE) interface is dynamically programmable. A single AFE circuit can interface with multiple different analog devices, and dynamically configure its input for efficient interfacing with each different analog device. The AFE receives multiple unprocessed analog input signals and samples the analog input signals. A preprocessor element in the AFE analyzes the input signals and generates control signals based on the analyzing. The control signals dynamically adjust how the AFE samples the analog input signals, and can improve the efficiency of the operation the AFE.

20 Claims, 7 Drawing Sheets

(56) References Cited

U.S. PATENT DOCUMENTS

2014/0232464 A1* 8/2014 Song ................... H04L 27/01
                                                      330/258
2014/0355697 A1* 12/2014 Magin .................. H04L 1/004
                                                      375/257
2015/0084688 A1* 3/2015 Chang ............... H03H 11/0466
                                                      327/555

OTHER PUBLICATIONS

TW Office Action (including Search Report) dated Apr. 21, 2016, English translation, 6 pages.

* cited by examiner

DYNAMICALLY CONFIGURABLE ANALOG FRONTEND CIRCUITRY

FIELD

Embodiments of the invention are generally related to I/O interfaces, and more particularly to a dynamically configurable analog frontend circuit.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2014, Intel Corporation, All Rights Reserved.

BACKGROUND

There has been a significant increase in the number of mobile devices, and the range of functionality provided by these devices. Mobile devices can include such devices as smartphones, wearable devices such as augmented reality headsets or the like, watches, or other wearable devices, and handheld computing, reading, and/or gaming devices. These mobile devices provide improved user interfacing and increased functionality by an increasing number of sensors or environmental detection equipment (generally referred to herein as sensors). Sensors typically generate an analog output (either a variable voltage and/or a variable current output) that must be first converted to digital form before it can be processed by digital processing components (microcontrollers, digital signal processors, or other processing devices). Examples of sensors can include motion sensors, accelerometers, temperature sensors, gyroscopes, location sensors, light detectors, sound/noise detectors, or other sensors.

It will be understood that while the input from the sensors can provide valuable information for a mobile device to provide increased functionality and/or an improved user interface experience, there are costs associated with using such sensors. More specifically, the increased use of sensors increases the size required for the mobile device, to accommodate the sensors. In addition to the increased size, the sensors require power, especially at the conversion interface (the analog interface). Some sensors have built-in analog interfaces to convert the native analog output (continuous value signal) to digital output (discretized signal). However, such capabilities increase the size and power requirements of the sensor. Traditionally each sensor has different requirements for interfacing based on the different outputs, the sensitivity levels of the sensors, the type of analog output or other interface type, and/or other requirements. Such differences can create significant interfacing inefficiencies.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, an analog frontend (AFE) circuit interface is dynamically programmable to interface with multiple different analog devices. The AFE circuit monitors the inputs from the various different analog devices, and dynamically configures its interface circuits for improved efficiency for interfacing with each different analog device. The AFE receives multiple unprocessed analog input signals and samples the analog input signals. A preprocessor element in the AFE analyzes the input signals and generates control signals based on the analyzing. The control signals dynamically adjust how the AFE samples the analog input signals, and can improve the efficiency of the operation the AFE. Processors can operate at significantly faster speeds (e.g., megahertz speeds) than the bandwidth of the sensors the AFE samples (e.g., Hertz to kilohertz speeds). Thus, the AFE can sample the analog outputs of multiple different devices. In one embodiment, the circuitry multiplexes inputs to further decrease space and power consumption.

In one embodiment, the AFE interfaces sensors to a sensor hub and/or a microcontroller or other processor. Traditionally, such an interface has included a combination of digital (e.g., I²C (inter-integrated circuit), SPI (serial peripheral interface)) and analog input channels. When sensor data is communicated over a digital interface, any amplification and digitization of the sensor signal is traditionally performed within the sensor package. Thus, the designer of a system that includes a sensor traditionally has little or no control over when and how the signal is sampled. As a result of having limited control over signal sampling, power optimizations are traditionally limited to the hooks provided by the sensor manufacturer (e.g. interrupts for signaling to a microcontroller). In contrast, the dynamically programmable or reprogrammable AFE described herein can bring sampling control within the AFE. By receiving raw sensor data, the AFE can control the input sampling, including controlling amplification, bandwidth, sampling rate, resolution, number and type of amplifiers used, and/or other parameters.

Some sensors with analog outputs can be interfaced directly with analog to digital converters (ADCs) on microcontrollers; however, the ADC resolution on microcontrollers is often insufficient to provide enough information for the system in which a sensor is used. Traditional approaches have added discrete amplifiers at the system level to mitigate limited ADC resolution, but adding such amplifiers increases the bill of materials (BOM) cost and finished product size. Another traditional approach to interfacing with analog sensor signals includes using a system on a chip (SoC) with internal programmable analog blocks. Such traditional programmable analog arrays are flexible and can be reconfigured at runtime to share resources and adjust settings, referred to as dynamic reconfiguration. However, traditional dynamic reconfiguration takes too much time (on the order of milliseconds per reconfiguration) and/or requires intervention from the main processor or microcontroller. The amount of time and/or intervention is not well suited to low power multi-sensor applications where each sensor could have different requirements that could change at varying rates (e.g., temperature sensor vs. accelerometer).

In contrast to traditional dynamic reconfiguration, the dynamic reconfiguration achievable by the AFE interface described herein allows microsecond adjustment to the operation of the AFE, and with components limited to the AFE. Thus, the dynamically configurable multi-sensor AFE allows much faster reconfiguration, and does not require external input from the primary processor. In one embodiment, the AFE can even filter input signals received, and discard signals or portions of signals that are not of interest to the primary processor. The AFE can include amplification, signal multiplexing, and sampling control combined in a single interface circuit for multiple different analog devices. In one embodiment, the AFE controller or control logic can continuously update the AFE configuration to improve or optimize the quality of the sensor data while also minimizing redundant samples for maximum efficiency. It will be understood that expressions such as "optimize" and "minimize" are relative terms, and do not necessarily mean an absolute maximum or minimum is achieved. Rather, optimize and minimize refer to achieving a level that is best fit for the current conditions based on the recent history of the sensor inputs, including the configuration and operation of the system, and the amount of processing power available within given time constraints. Thus, optimum or minimum can be constrained within tolerances built into the system architecture. Including sampling control within the AFE can enable lower overall power consumption and reduce the required data bandwidth between a collection of sensors and the sensor hub/processor that will use the sensor data.

Figure 1:
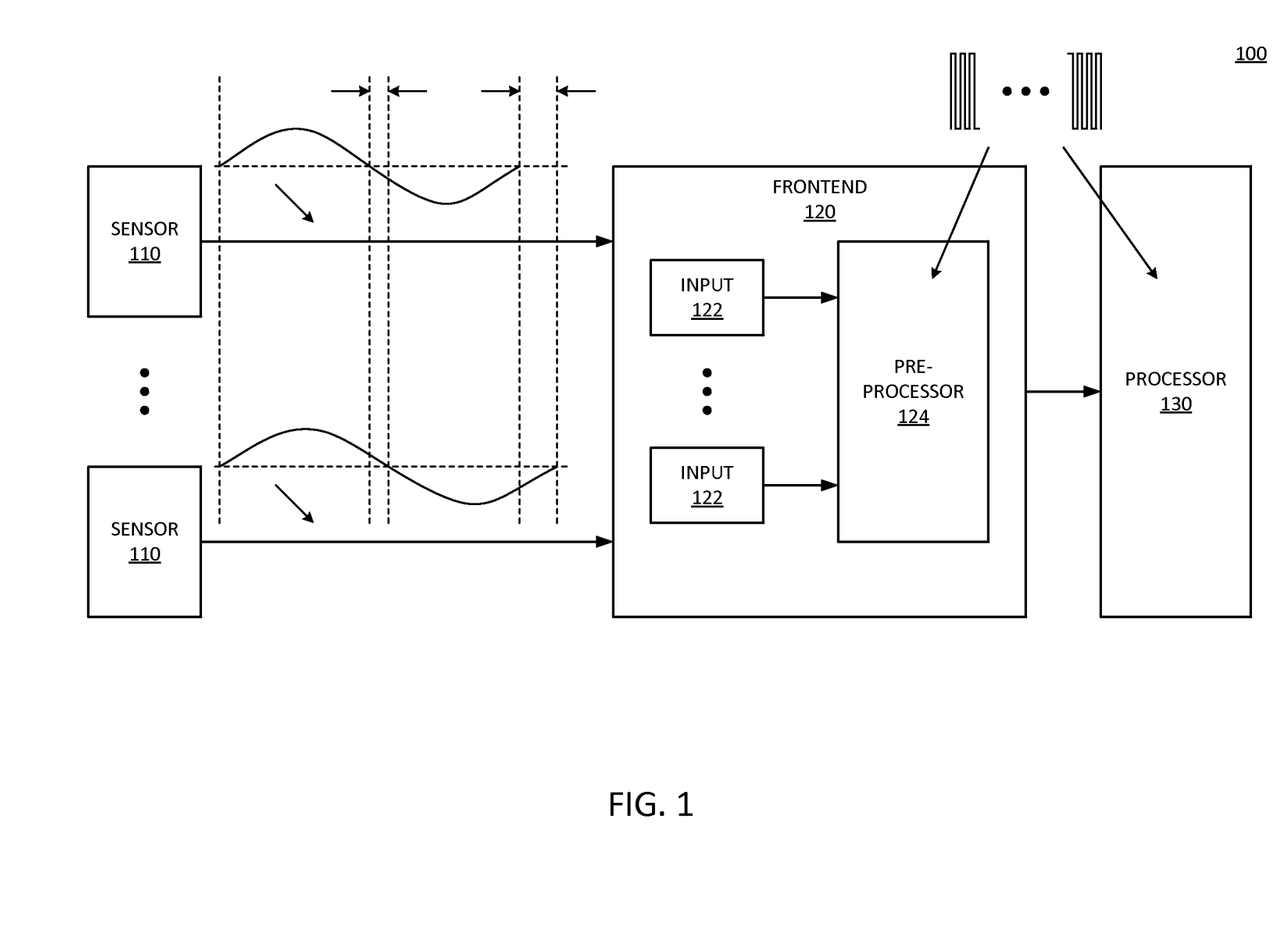
FIG. 1 is a block diagram of an embodiment of a system with a dynamically programmable analog frontend circuit.

FIG. 1 is a block diagram of an embodiment of a system with a dynamically programmable analog frontend circuit. System 100 represents any type of system in which multiple sensors may be used, and includes multiple sensors 110 coupled to frontend circuit 120, which in turn is coupled to processor 130. Processor 130 is a primary or main processor or microcontroller in system 100, and can be considered to be associated with or correspond to frontend circuit 120. Processor 130 could be directly coupled to frontend 120, or coupled to frontend 120 via a sensor hub or comparable circuit. Processor 130 executes operations based on data gathered from sensors 110, and can thus be said to be the component that uses the sensor data.

Sensors 110 provide data to processor 130. The data can include one or more of environmental data (motion, temperature, ambient light, or other data), biometric data (heart rate, pulse, skin metrics, fingerprint, optical scan information, or other biometric information), or other data detected about a condition and/or a user. Sensors 110 include at least one component that generates an analog output. In one embodiment, one or more of sensors 110 includes analog interface circuitry within the sensor package. The level of processing provided by such a local analog interface circuit can be minimal or can be more significant (e.g., providing a digital output). Examples of sensors 110 can include accelerometers, motion sensors, gyroscopes, temperature sensors, location sensors, light detectors, sound/noise detectors, or other sensors.

System 100 includes a representation of relative timing cycles. The two sensors 110 shown provide an analog input to frontend 120. In one embodiment, the timing cycles of the two sensors is slightly different, as shown (one of the cycles is slightly shorter than the other, as shown by the relative zero-cross points illustrated by the dashed lines). However, the two cycles for the two sensors are comparable, in that the cycle of their operation is similar. Contrast the frequency of operation of sensors 110 with that of preprocessor 124 and processor 130, which are illustrated to have a much higher frequency of operation. The specific frequencies shown are not limiting, and are not necessarily to scale; however, the relative difference between the frequency of operation of the processors and that of the data of interest from sensors 110 illustrates that the processors operate at much higher frequencies than the frequency at which data from the sensors changes.

Frontend 120 can be implemented as integrated components in a circuit integrated with another circuit and/or as a discrete circuit. For example, in one embodiment, frontend 120 can be integrated onto a die or substrate on which processor 130 is disposed. In one embodiment, frontend 120 is a discrete circuit (e.g., with a separate substrate and/or PCB (printed circuit board) from processor 130). In one embodiment, frontend 120 can be implemented as a combination of integrated and discrete components (e.g., integrating preprocessor 124 and implementing the other elements as discrete components). Thus, frontend 120 can be implemented as an integrated component design and/or assembled from off-the-shelf or specialized discrete components.

System 100 consolidates analog frontend circuitry with frontend circuit 120. In one embodiment, frontend circuit 120 is a standalone component or sensor hub that consolidates sensor input from sensors 110 to provide to processor 130. In one embodiment, frontend circuit 120 couples to a sensor hub (not specifically shown) that can operate in parallel with frontend 120. In one embodiment, frontend circuit 120 is part of processor 130 or a circuit or component of an SoC or multichip package. Frontend circuit 120 can allow sensors 110 to be operated with minimal or possibly no analog frontend within the sensor package. In one embodiment, an analog frontend on a sensor 110 can be bypassed to interface with frontend 120. A bare or minimal frontend on sensors 110 may still require some analog interfacing, such as capacitive circuitry and/or an amplifier to prevent parasitics from overwhelming the output signal. In one embodiment, frontend circuit 120 receives unprocessed analog signals from sensors 110. Unprocessed can refer to any analog output that is an analog signal from a sensor with a bare or minimal frontend. Thus, unprocessed signals can still include signals that are amplified and/or capacitively filtered to prevent parasitics from overwhelming the signals. Unprocessed refers to signals provided where frontend circuit 120 can control the sampling, digitization, and processing of the signal.

Frontend 120 includes multiple analog inputs 122. Inputs 122 provide analog processing on the input signals, including sampling the analog signals and converting the signals to digital format. Preprocessor 124 receives digital samples from inputs 122 to preprocess or filter the data. In one embodiment, preprocessor 124 determines whether or not the data should be passed to processor 130. For example, preprocessor 124 can determine that a signal represents duplicate data and does not need to be passed to processor 130, or can determine that the signal does not represent a triggering event for the particular environmental condition monitored by the sensor. There can also be other or alternative reasons preprocessor 124 determines not to send data to processor 130. In one embodiment, when preprocessor 124 determines not to send data to processor 130, it discards the data and does not store it.

Frontend 120 includes multiple analog inputs 122. In one embodiment, each input is a separate input circuit that includes dynamically configurable (runtime configurable) operation. Thus, preprocessor can generate control signals to control the operation of the each analog input 122. In one embodiment, multiple analog inputs 122 are multiplexed to common input circuit components (described in more detail below with respect to system 200 of FIG. 2). Preprocessor 124 can generate control signals to vary or adjust the sampling rates, input gains, timing, and/or other aspect of the analog input.

Figure 2A:
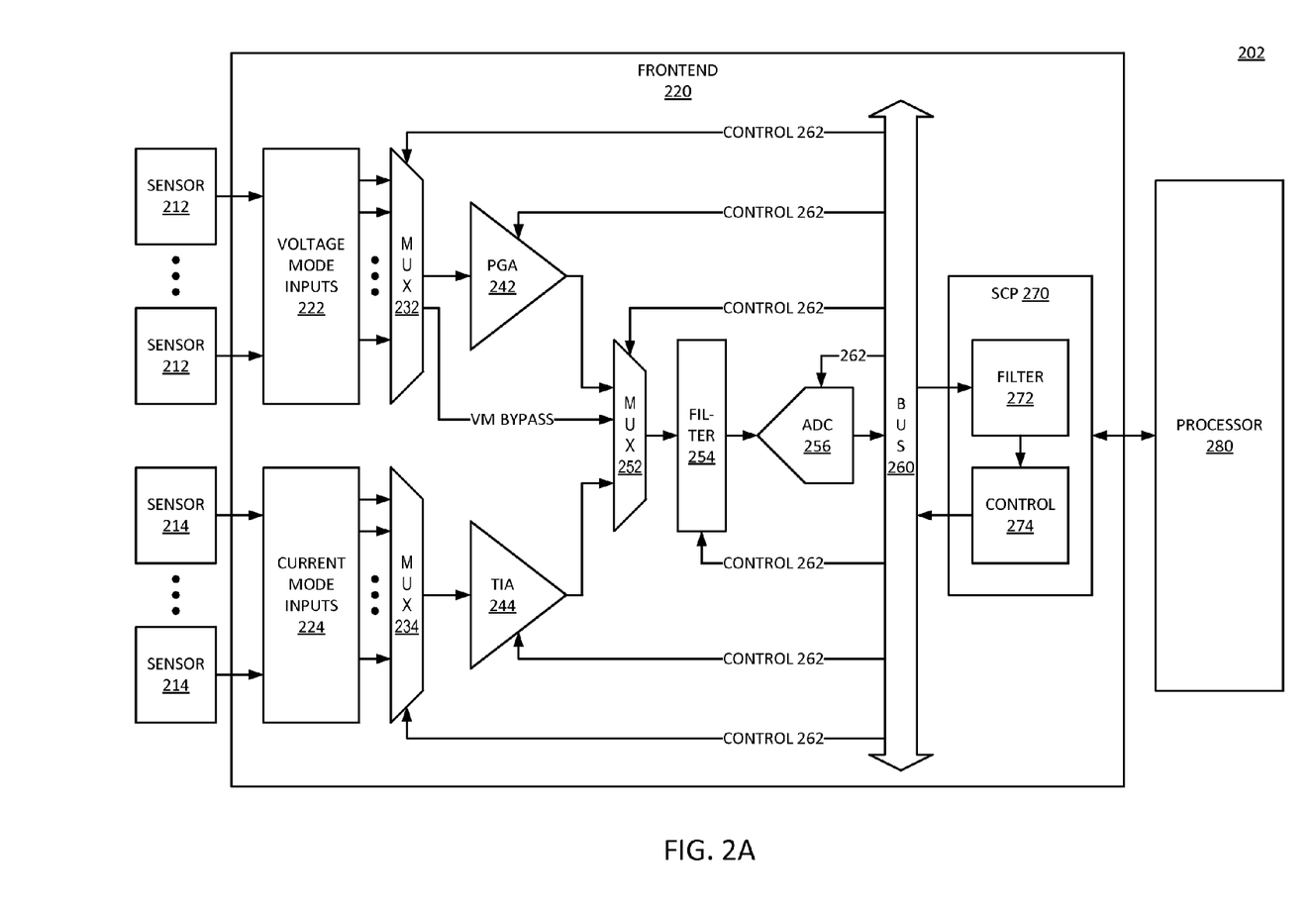
FIG. 2A is a block diagram of an embodiment of a system with a multiplexed dynamically programmable analog frontend circuit.

FIG. 2A is a block diagram of an embodiment of a system with a multiplexed dynamically programmable analog frontend circuit. System 202 includes frontend 220, which includes multiplexed analog inputs. System 202 can be one example of a system in accordance with system 100 of FIG. 1. Frontend 220 is coupled to associated processor 280, which ultimately uses data from the analog inputs to control operation of a computing device. Processor 280 can be a primary processor or host processor for the computing device, or a peripheral processor that executes in parallel with a primary processor. Frontend 220 represents one example of a frontend circuit in accordance with any embodiment described herein.

System 200 includes one or more sensors 212, which generate voltage mode analog outputs, and one or more sensors 214, which generate current mode analog outputs. Voltage mode refers to an analog output that could be single-ended or differential, and current mode refers to an analog current output. Frontend 220 receives inputs from voltage mode sensors 212 at voltage mode input circuitry 222. Frontend 220 receives inputs from current mode sensors 214 at current mode input circuitry 224. Inputs 222 and 224 represent pins or connectors and signal lines to receive the sensor signals. In one embodiment, frontend 220 is a multiplexed AFE, where multiple sensors (212, 214) share the same analog circuitry (e.g., analog amplifiers and data converters), which can save area and power. Thus, inputs 222 and 224 provide the analog inputs to respective multiplexers 232 and 234. Multiple inputs can share the same analog input hardware because the analog hardware is otherwise underutilized, given that the speed or frequency of operation of the analog components and the processing components is much higher than the rate of change of the sensor input (e.g., by one or more orders of magnitude).

In one embodiment, voltage mode multiplexer 232 can select a specific analog input from sensors 212 for amplification by amplifier 242. In one embodiment, amplifier 242 is a programmable gain amplifier (PGA), which can be used to increase the magnitude of an incoming voltage signal. In one embodiment, current mode multiplexer 234 can select a specific analog input from sensors 214 for amplification by amplifier 244. In one embodiment, amplifier 244 is a transimpedance amplifier (TIA), which provides a variable voltage output based on the magnitude of the incoming current. Thus, both amplifiers 242 and 244 can generate an output voltage.

Amplifiers 242 and 244 provide their voltage outputs to one or more analog to digital converters (ADCs) 256. In one embodiment, frontend 220 includes multiplexer 252 or other selection logic to route output signals from the amplifiers to the one or more ADCs. In one embodiment, frontend 220 includes filter 254 to provide a filter stage prior to the ADC. Filter 254 could include a low-pass anti-aliasing filter and/or other more complex filter components. In one embodiment, filter 254 includes adjustable behavior that can be tuned or adjusted in response to analysis by SCP 270. Filter 254 can be adjustable based on the type of input that ADC 256 will sample. ADC 256 represents an analog to digital conversion stage, which can include multiple different devices. It will also be understood that voltage mode inputs 222 and/or current mode inputs 224 could be subdivided into multiple different devices, as can multiplexers 232 and/or 234. ADC 256 converts an analog signal into a digital representation. The amplified signal converted by ADC 256 is a discrete sample of what is typically a continuous output by the sensors. Thus, ADC 256 can be said to create a digital representation of a sample, or to generate a digital sample.

In one embodiment, ADC 256 passes digital output(s) to signal control and processing (SCP) block 270 via bus 260. SCP 270 can be one example of a preprocessor as illustrated in system 100. In one embodiment, SCP includes multiple digital signal processing (DSP) blocks. In one embodiment, SCP 270 is or includes multiple DSP units that are tailored for common sensor types as well as including dynamically programmable DSP units that can be customized to interface with other (e.g., future) sensor types. Bus 260 represents any one or more groups of signal lines that interface with multiple different circuit components. Bus 260 is typically routed on a substrate on which frontend 220 is processed to various components disposed on (or in) the substrate. In one embodiment, SCP 270 can perform an initial analysis to determine the quality of the sensor data sample, and/or determine whether a noteworthy event has occurred or is occurring (e.g., whether the data indicates something that would require processor 280 to execute an operation). Thus, the preprocessing can enable processor 280 (or sensor hubs, microcontrollers, microprocessors, DSPs, or other processing components) to sleep until relevant sensor data is received.

In one embodiment, SCP 270 includes a collection of hard-wired algorithms and/or programmable units that asses the quality and utility of incoming data. In one embodiment, SCP 270 is a mixed processing block that is part of processor 280, but with a separate power supply. Processor 280 can be an application specific processor. Based on the initial processing or the preprocessing, SCP 270 provides feedback to the analog components of fronted 220. Thus, SCP 270 provides dynamic runtime control of the analog components which can improve the efficiency of operation of the components. As illustrated in system 200, control signals 262 feed back from bus 260 to the analog components. In one embodiment, SCP 270 can generate control signals 262 for one or more of the multiplexers (232, 234, 252), the amplifiers (242, 244), and/or ADC 254. Control signals 262 can adjust sampling rates, bandwidths, gains, or other operational parameters of the analog components.

SCP 270 is illustrated to include filter 272 and control 274. Control 274 represents functionality in SCP 270 to generate feedback or control signals to control the sampling operation of the analog components. Filter 272 represents functionality in SCP 270 that enables preprocessing the digital samples of the inputs. Filter 272 can include any one or more of the following types of processing capabilities. In one embodiment, filter 272 enables SCP 270 to apply digital filtering to incoming signals. Digital filtering can include removing analog signal noise (e.g., removing 60 Hz noise), or other de-noising operation. De-noising can refer to smoothing the signal. In one embodiment, filter 272 enables SCP 270 to apply a discrete Fourier transform (DFT) filter. A DFT filter can filter data for specific frequencies of interest. For example, SCP 270 can detect a certain frequency in an input signal and trigger frontend 220 to adjust a sampling rate based on detecting the frequency. In one embodiment, filter 272 enables SCP 270 to perform coarse feature recognition by detecting peaks in an incoming signal, such as frequency pulses or signal strength peaks. In one embodiment, filter 272 includes field programmable gate array (FPGA) logic, which can perform any of a variety of custom programmable functions. It will be understood that the examples described are merely illustrative, and filter 272 can include selected ones of the examples, and/or other processing capability not specifically described.

Control 274 can generate feedback control signals to control the sampling and interfacing operation of frontend 220. Control 274 can generate any one or more of the following control signals. In one embodiment, control 274 enables SCP 270 to generate an amplifier gain control signal. The amplifier gain can adjust the gain up for a signal with a swing that does not utilize the full swing of the amplifier or amplitude range of the ADC. Conversely, for a signal that runs into the rails, the gain control signal can adjust the gain down. In one embodiment, control 274 enables SCP 270 to generate an amplifier bandwidth control signal. The amplifier bandwidth control signal can adjust operation of the tradeoff between bandwidth and gain of amplifier 242 and/or 244. In one embodiment, control 274 enables SCP 270 to generate control signals to select specific inputs from multiplexers 232, 234, and/or 252. In one embodiment, control 274 enables SCP 270 to generate a control signal to adjust the filtering of filter 254, such as by adjusting operation based on the type of input to be sampled. In one embodiment, control 274 enables SCP 270 to generate a control signal to adjust a sampling rate of ADC 256 and/or to adjust a number of bits of resolution of the output signal generated by ADC 256 (e.g., only output 8 bits of resolution when the ADC is capable of generating 12 bits of resolution). In one embodiment, control 274 enables SCP 270 to generate a control signal to cause an analog component to sleep or enter a low power state. In one embodiment, control 274 enables SCP 270 to generate a control signal to cause an analog component to wake from a low power state, such as waking on a specific condition (e.g., a specific input, an input greater than or less than a threshold, a change in an input, or other condition). In one embodiment, control 274 enables SCP 270 to generate a control signal to control the number of amplification stages frontend 220 will use. For example, amplifiers 242 and/or 244 can be multistage amplifiers, where control signal(s) 262 can switch the operation of either or both amplifiers from a single stage amplifier to a multistage amplifier. It will be understood that the examples described are merely illustrative, and control 274 can generate selected ones of the examples, and/or control signals not specifically described.

In one embodiment, frontend 220 interfaces with signals that can be fed directly through, without the need for amplification. It will be understood that ADC 254 may not be able to convert a current mode signal into a digital output, and thus, it may not be possible to bypass TIA 244. However, for voltage mode signals, in one embodiment, one or more control signals 262 can control multiplexer 252 to bypass PGA 242 directly to multiplexer 252 (or to ADC 254, depending on system configuration). SCP 270 can generate control signals 262 to control whether or not an input signal bypasses the amplifier.

In one embodiment, SCP 270 generates control signals 262 to cause the analog components of frontend 220 to use the minimum gain and minimum power necessary to provide a clear signal. In one embodiment, SCP 270 can filter and control the inputs based on sensor correlation. For example, consider two sensors that do not generate the exact same data, but whose data in a certain circumstance may be duplicative. In one embodiment, SCP 270 can filter and/or skip an input based on correlation of the data between sensors. Such logic can be built into SCP 270 and/or programmed into a programmable element of SCP 270.

Figure 2B:
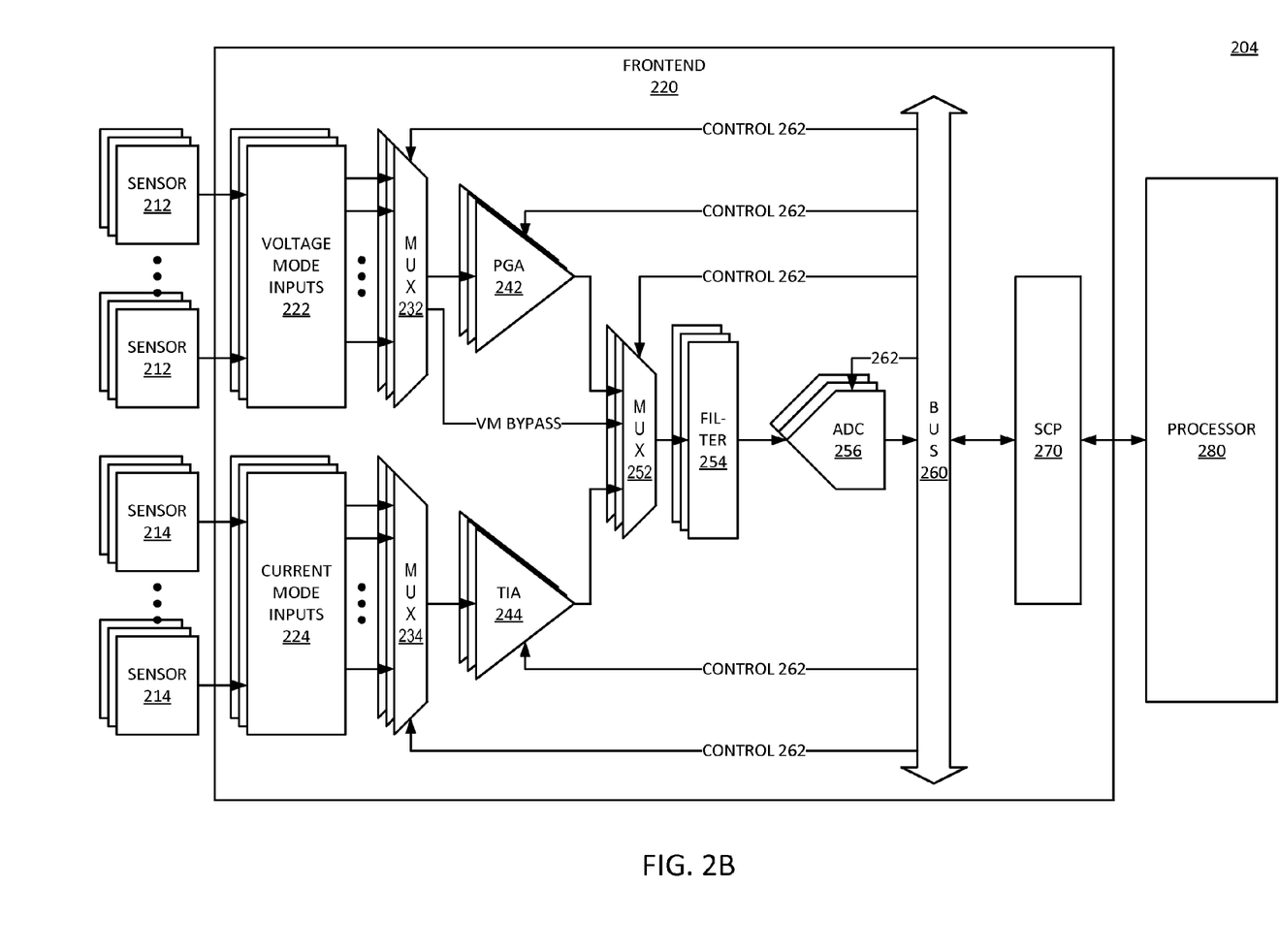
FIG. 2B is a block diagram of an embodiment of a system with a multiplexed dynamically programmable analog frontend circuit illustrating multiple input pathways.

FIG. 2B is a block diagram of an embodiment of a system with a multiplexed dynamically programmable analog frontend circuit illustrating multiple input pathways. System 204 can be one example of a system in accordance with system 100 of FIG. 1 and system 202 of FIG. 2A. The elements of system 204 are labeled with the same reference numerals as the elements of system 202, and the descriptions above with respect to system 202 apply equally to the elements of system 204. System 204 more specifically illustrates that there can be multiples of one or more of the analog frontend elements. Thus, there can be many sensors 210 coupled to multiple inputs 222 and/or 224. Multiple inputs can provide signal inputs to one or more multiplexers 232 and/or 234. One or more multiplexers 232 and/or 234 can provide inputs to one or more amplifiers 242 and/or 244. One or more amplifiers 242 and/or 244 can provide signals to one or more multiplexers 252, which can in turn provide signals to one or more filters 254. The one or more filters 254 can provide signals to one or more ADCs 256, which sample the inputs for SCP 270.

Figure 3A:
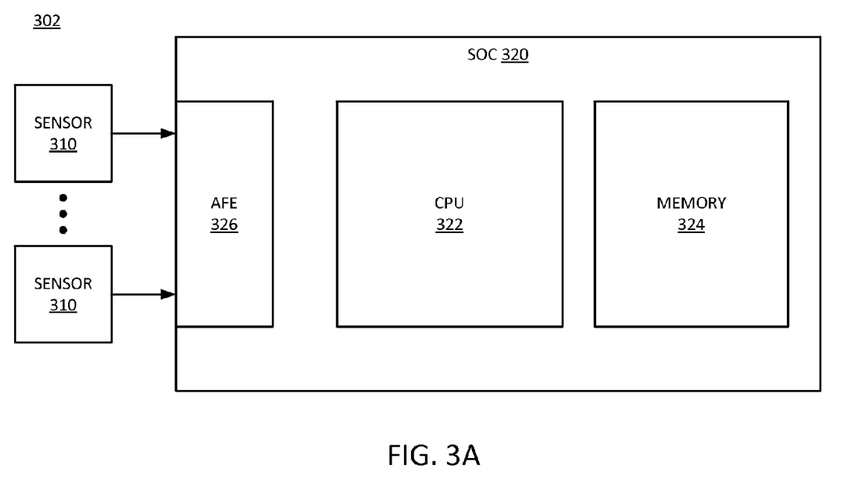
FIG. 3A is a block diagram of an embodiment of a system with a dynamically programmable analog frontend circuit in a system on a chip.

FIG. 3A is a block diagram of an embodiment of a system with a dynamically programmable analog frontend circuit in a system on a chip. System 302 can be one example of a system in accordance with system 100 of FIG. 1 and/or system 200 of FIG. 2. System 302 includes multiple sensors 310, which interface with system on a chip (SoC) 320. SoC 320 can be a single chip with multiple elements integrated together, or can be a single package with multiple chips assembled together (more commonly referred to as a multichip package (MCP)).

SoC 320 includes CPU (central processing unit) 322 or other primary processor. SoC 320 can be a host processor system for a computing device, or an application specific integrated circuit (ASIC) that is part of a larger computing device system. CPU 322 executes the host operating system for SoC 320, and generally includes the control logic to control the overall operation of SoC 320. CPU 322 generally controls the operations that create the computing functionality which SoC 320 is expected to provide.

SoC 320 includes memory 324, which represents memory storage resources local to SoC 320. Memory 324 can include volatile and/or nonvolatile memory resources. Nonvolatile memory is memory that maintains state even if power is interrupted to the memory. Volatile memory is memory whose state is indeterminate if power is interrupted to the memory. Memory 324 can be implemented where one or more memory elements are local to CPU 322 (e.g., on-chip cache). Memory 324 generally stores data and code to support the execution of operations of CPU 322.

SoC 320 includes AFE 326, which is a frontend circuit in accordance with any embodiment described herein. AFE 326 interfaces SoC 320 to sensors 310. AFE 326 can include voltage mode and/or current mode inputs. In one embodiment, AFE 326 multiplexes inputs from sensors 310 to reduce the amount of analog circuitry needed to implement the frontend. AFE 326 is dynamically configurable, which allows the frontend circuit to adjust its operation and sampling of analog inputs to improve efficiency of operation. AFE 326 includes a preprocessor (not specifically shown) to generate feedback to analog input elements (not specifically shown) to dynamically adjust their operation. Thus, AFE 326 can change operation at runtime to improve the efficiency of the interface with sensors 310.

Figure 3B:
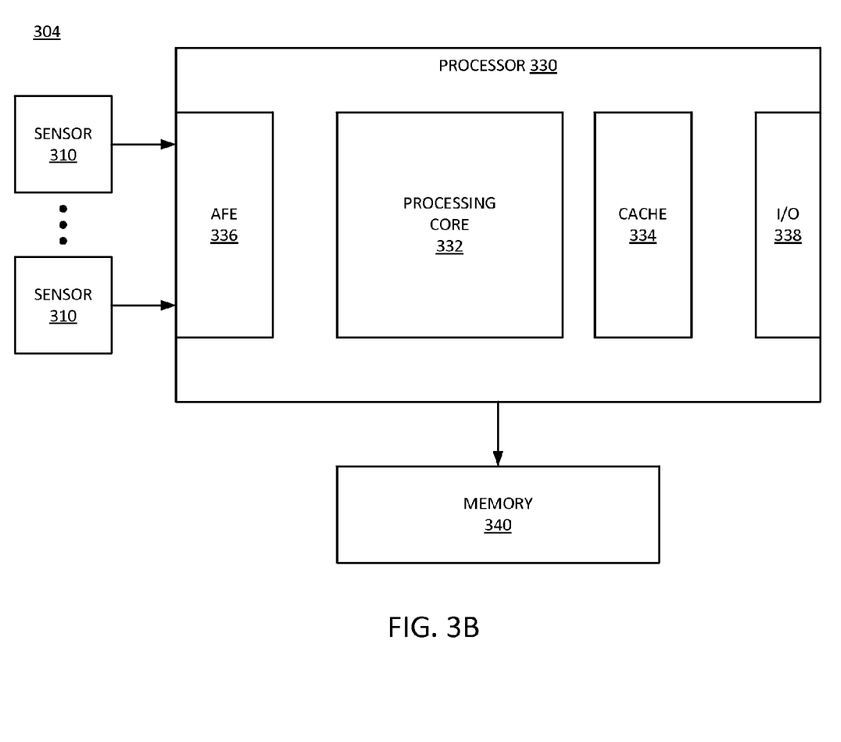
FIG. 3B is a block diagram of an embodiment of a system with a dynamically programmable analog frontend circuit in a processor.

FIG. 3B is a block diagram of an embodiment of a system with a dynamically programmable analog frontend circuit in a processor. System 304 can be one example of a system in accordance with system 100 of FIG. 1 and/or system 200 of FIG. 2. System 304 includes multiple sensors 310, which interface with processor 330. Processor 330 represents a primary processor for system 304. In one embodiment, processor 310 is a host processor system for a computing device, or an application specific integrated circuit (ASIC) that is part of a larger computing device system. Processor 330 executes a host operating system for system 304 and generally includes the control logic to control the overall operation of system 304.

In one embodiment, processor 330 includes processing core 332, which represents one or multiple cores that perform the processing operations of processor 330. Processor 330 can include cache 334, which represents memory storage resources local to processor 330. Cache 334 is typically volatile memory, next-generation memory technologies can be nonvolatile and have access speeds comparable with current-generation memory technologies used as cache. Cache 334 generally stores data and code to support the execution of operations of processing core 332.

Processor 330 includes I/O (input/output) 338, which represents external interface logic that can interface with other electronics components (not shown) in a computing system. I/O 338 can also be used to access external memory 340. Memory 340 can include volatile and/or nonvolatile memory resources, and stores data and commands that support the execution of processor 330. Typically, memory 340 is larger and slower than cache 334. Memory 340 of system 304 can be comparable to memory 324 of system 302 discussed above.

In one embodiment, processor 330 includes AFE 336, which is a frontend circuit in accordance with any embodiment described herein. AFE 336 interfaces processor 330 to sensors 310. AFE 336 can include voltage mode and/or current mode inputs. In one embodiment, AFE 336 multiplexes inputs from sensors 310 to reduce the amount of analog circuitry needed to implement the frontend. AFE 336 is dynamically configurable, which allows the frontend circuit to adjust its operation and sampling of analog inputs to improve efficiency of operation. AFE 336 includes a preprocessor (not specifically shown) to generate feedback to analog input elements (not specifically shown) to dynamically adjust their operation. Thus, AFE 336 can change operation at runtime to improve the efficiency of the interface with sensors 310.

Figure 4:
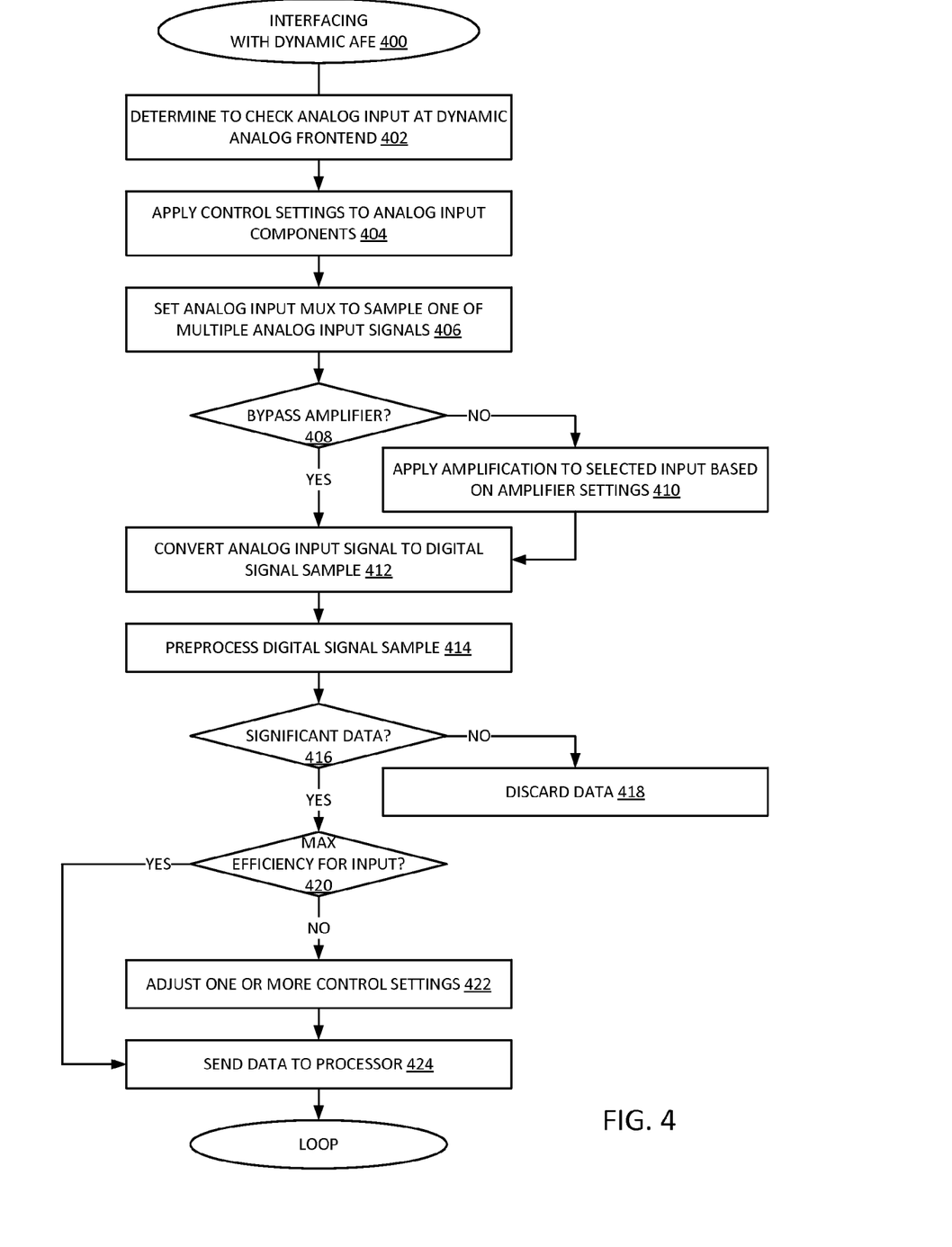
FIG. 4 is a flow diagram of an embodiment of a process for interfacing using a dynamically programmable analog frontend circuit.

FIG. 4 is a flow diagram of an embodiment of a process for interfacing using a dynamically programmable analog frontend circuit. Process 400 described interfacing with multiple sensors via a dynamic AFE in accordance with any embodiment described herein. In one embodiment, an AFE circuit is part of a processor, a processing unit, a system on a chip, or other system that interfaces with multiple sensor devices. Specifically, the AFE interfaces with sensors that generate an analog output.

In one embodiment, the AFE determines to check an analog input, 402. In one embodiment, the AFE checks analog inputs at the request of a system-level processor that requests sensor input data. In one embodiment, the AFE continuously monitors the analog inputs, continuously selecting from among the multiple sensor devices to sample the analog input. In one embodiment, the AFE monitors the sensors semi-continuously by cycling through inputs on a schedule in accordance with one or more timers to keep track of which sensor to sample when. Whether by request from an external processor, or by schedule or determination from an internal routine, the AFE can be said to receive an analog input or sample an analog input based on a trigger. The trigger can be the request, timer value, or process determination to sample an analog input.

The AFE applies control settings to analog circuit components, 404. In one embodiment, the AFE provides different control settings for each different input. Thus, the AFE can dynamically adjust sampling operation for each different analog input to be sampled. The AFE applies the current settings to the analog circuit components based on which input is to be sampled. As described in more detail below, the AFE can then dynamically adjust how the sampling is executed based on feedback provided from a preprocessor that is part of the AFE. In one embodiment, the AFE is multiplexed. Thus, as part of the settings or in conjunction with other settings, the AFE can set an analog multiplexer to sample one of multiple different analog input signals, 406.

In one embodiment, an input provides a sufficient signal that does not need amplification for a good reading. Thus, the AFE can allow the input signal to bypass an amplifier stage. If the AFE does not bypass the amplifier, 408 NO branch, the AFE applies amplification to a selected analog input based on settings for the amplifier, 410. The settings can be changed for each different input. If the AFE is to bypass the amplifier, 408 YES branch, or after applying the amplification, 410, an analog to digital conversion stage converts the analog input signal sample to a digital signal sample, 412.

The analog to digital conversion stage can pass the digital sample to a preprocessor (e.g., an SCP) that performs preliminary processing on the digital signal sample prior to sending the data to a primary processor, 414. The preprocessor can apply any of a number of filters or other preprocessing on the digital sample, such as what is described above. In one embodiment, the preprocessing stage determines whether the digital signal sample represents significant data. It will be understood that a determination as to what is significant data will vary from sensor to sensor, and from implementation to implementation. For example, one system could use a thermal sensor, and can determine that the thermal sensor output is not significant unless the primary processor has to respond to a thermal event. The thermal event may be, for example, a temperature reading above a threshold, or a change of temperature greater than a predetermined range within a predetermined period of time. There are countless other examples, which will depend on the sensor types and the system in which the sensors are implemented.

In one embodiment, if the preprocessor determines the data is not significant, 416 NO branch, the preprocessor can discard all or a portion of the data, 418. There may be no need to wake or interrupt a primary processor with sensor data unless it represents a specific sensor event or condition, which can be programmed into the preprocessor. If the data is significant, 416 YES branch, or even if the data was not significant, the preprocessor can determine if the digital sample was a sample of sufficient quality or greater quality than needed to interpret the data. The preprocessor analyzes the data based on a number of different factors for each sensor to determine if the analog operation is efficient. If the data is of greater quality or precision or resolution than needed, the preprocessor can determine that it would be more efficient for the AFE to sample the signal at lower precision, lower bandwidth, lower resolution, lower power, and/or some other adjustment. Alternatively, if the sample is of insufficient quality to provide a good reading (as defined by predetermined settings with the preprocessing stage), the preprocessor can determine that higher precision, bandwidth, resolution, power, and/or other adjustment would be more efficient.

If the AFE is operating at a maximum efficiency for the specific input in the given conditions, 420 YES branch, the preprocessor can send the data to a primary processor that uses the sensor data, 424. If the AFE is not operating at maximum efficiency, 420 NO branch, the preprocessor can adjust one or more settings of the analog components by generating one or more control signals, 422. The preprocessing stage can continuously monitor and adjust analog component settings and operation. In one embodiment, the preprocessor includes storage to save settings for each input. The preprocessor can set the saved settings and adjust the saved settings depending on the operation observed by the preprocessor.

Figure 5:
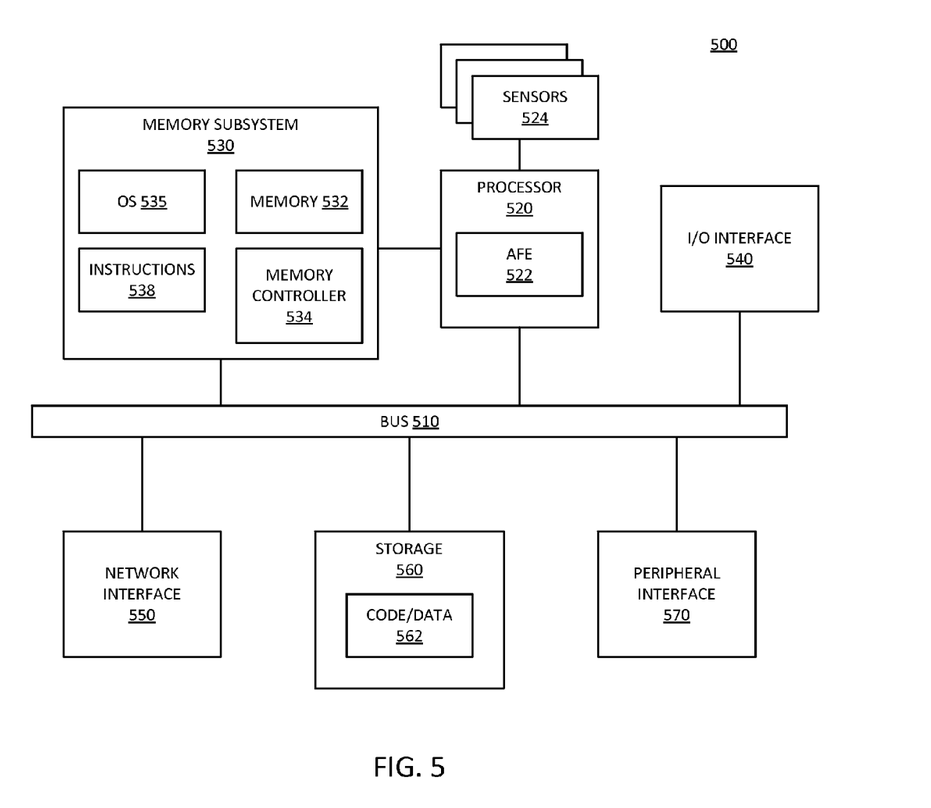
FIG. 5 is a block diagram of an embodiment of a computing system in which a dynamically programmable analog frontend circuit can be implemented.

FIG. 5 is a block diagram of an embodiment of a computing system in which a dynamically programmable analog frontend circuit can be implemented. System 500 represents a computing device in accordance with any embodiment described herein, and can be a laptop computer, a desktop computer, a server, a gaming or entertainment control system, a scanner, copier, printer, routing or switching device, or other electronic device. System 500 includes processor 520, which provides processing, operation management, and execution of instructions for system 500. Processor 520 can include any type of microprocessor, central processing unit (CPU), processing core, or other processing hardware to provide processing for system 500. Processor 520 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 530 represents the main memory of system 500, and provides temporary storage for code to be executed by processor 520, or data values to be used in executing a routine. Memory subsystem 530 can include one or more memory devices such as read-only memory (ROM), flash memory, one or more varieties of random access memory (RAM), or other memory devices, or a combination of such devices. Memory subsystem 530 stores and hosts, among other things, operating system (OS) 536 to provide a software platform for execution of instructions in system 500. Additionally, other instructions 538 are stored and executed from memory subsystem 530 to provide the logic and the processing of system 500. OS 536 and instructions 538 are executed by processor 520. Memory subsystem 530 includes memory device 532 where it stores data, instructions, programs, or other items. In one embodiment, memory subsystem includes memory controller 534, which is a memory controller to generate and issue commands to memory device 532. It will be understood that memory controller 534 could be a physical part of processor 520.

Processor 520 and memory subsystem 530 are coupled to bus/bus system 510. Bus 510 is an abstraction that represents any one or more separate physical buses, communication lines/interfaces, and/or point-to-point connections, connected by appropriate bridges, adapters, and/or controllers. Therefore, bus 510 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 510 can also correspond to interfaces in network interface 550.

System 500 also includes one or more input/output (I/O) interface(s) 540, network interface 550, one or more internal mass storage device(s) 560, and peripheral interface 570 coupled to bus 510. I/O interface 540 can include one or more interface components through which a user interacts with system 500 (e.g., video, audio, and/or alphanumeric interfacing). In one embodiment I/O interface 540 includes components that provide a visual and/or tactile display and/or visually perceptible output for a user to interact with system 500. In one embodiment, the display includes a touchscreen device that both provides output to and receives input from a user. In one embodiment, the display includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others.

Network interface 550 provides system 500 the ability to communicate with remote devices (e.g., servers, other computing devices) over one or more networks. Network interface 550 can include an Ethernet adapter, wireless interconnection components, USB (universal serial bus), or other wired or wireless standards-based or proprietary interfaces. Storage 560 can be or include any conventional medium for storing large amounts of data in a nonvolatile manner, such as one or more magnetic, solid state, or optical based disks, or a combination. Storage 560 holds code or instructions and data 562 in a persistent state (i.e., the value is retained despite interruption of power to system 500). Storage 560 can be generically considered to be a "memory," although memory 530 is the executing or operating memory to provide instructions to processor 520. Whereas storage 560 is nonvolatile, memory 530 can include volatile memory (i.e., the value or state of the data is indeterminate if power is interrupted to system 500).

Peripheral interface 570 can include any hardware interface not specifically mentioned above. Peripherals refer generally to devices that connect dependently to system 500. A dependent connection is one where system 500 provides the software and/or hardware platform on which operation executes, and with which a user interacts.

In one embodiment, processor 520 includes AFE 522, which is a frontend circuit in accordance with any embodiment described herein. AFE 522 interfaces processor 520 to multiple sensors 524, which could be connected, for example, via I/O interface 540 and/or peripheral interface 570. In one embodiment, sensors 524 are connected via an interface not directed shown in system 500. AFE 522 can include voltage mode and/or current mode inputs. In one embodiment, AFE 522 multiplexes inputs from multiple sensors to reduce the amount of analog circuitry needed to implement the frontend. AFE 522 is dynamically configurable, which allows the frontend circuit to adjust its operation and sampling of analog inputs to improve efficiency of operation. AFE 522 includes a preprocessor (not specifically shown) to generate feedback to analog input elements (not specifically shown) to dynamically adjust their operation. Thus, AFE 522 can change operation at runtime to improve the efficiency of the interface with the sensors.

Figure 6:
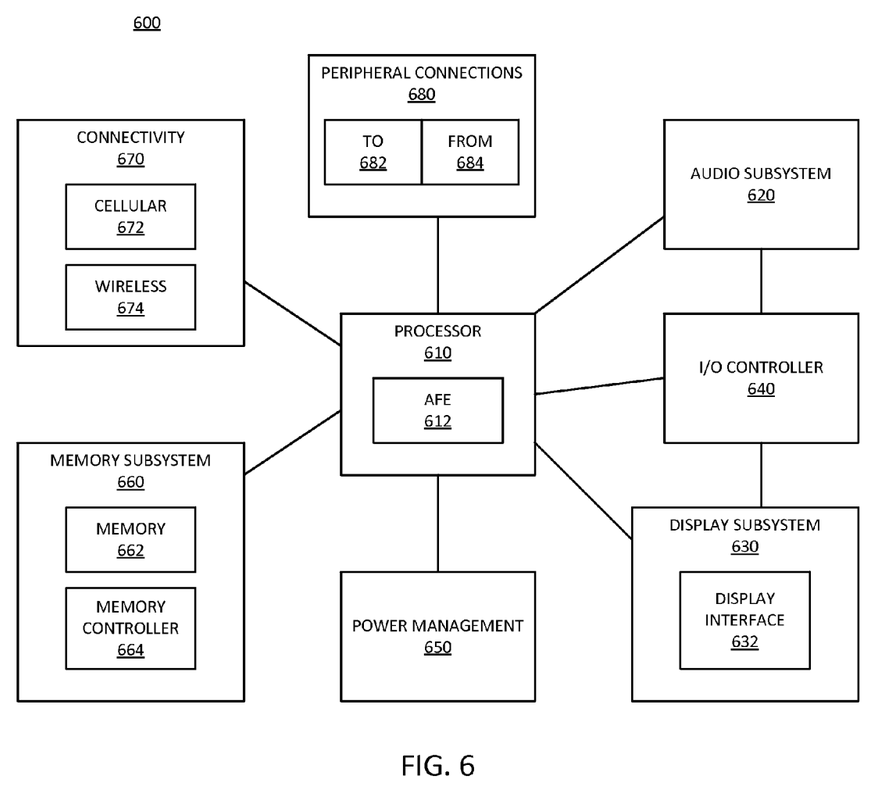
FIG. 6 is a block diagram of an embodiment of a mobile device in which a dynamically programmable analog frontend circuit can be implemented.

FIG. 6 is a block diagram of an embodiment of a mobile device in which a dynamically programmable analog frontend circuit can be implemented. Device 600 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 600.

Device 600 includes processor 610, which performs the primary processing operations of device 600. Processor 610 can include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations can also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display and/or visually perceptible output for a user to interact with the computing device. Display subsystem 630 includes display interface 632, which includes the particular screen or hardware device used to provide a display to a user. In one embodiment, display interface 632 includes logic separate from processor 610 to perform at least some processing related to the display. In one embodiment, display subsystem 630 includes a touchscreen device that both provides output to and receives input from a user. In one embodiment, display subsystem 630 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others.

I/O controller 640 represents hardware devices and software components related to interaction with a user. I/O controller 640 can operate to manage hardware that is part of audio subsystem 620 and/or display subsystem 630. Additionally, I/O controller 640 illustrates a connection point for additional devices that connect to device 600 through which a user might interact with the system. For example, devices that can be attached to device 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of device 600. Additionally, audio output can be provided instead of or in addition to display output. In another example, if display subsystem includes a touchscreen, the display device also acts as an input device, which can be at least partially managed by I/O controller 640. There can also be additional buttons or switches on device 600 to provide I/O functions managed by I/O controller 640.

In one embodiment, I/O controller 640 manages devices such as accelerometers, cameras, light sensors or other environmental sensors, gyroscopes, global positioning system (GPS), or other hardware that can be included in device 600. The input can be part of direct user interaction, as well as providing environmental input to the system to influence its operations (such as filtering for noise, adjusting displays for brightness detection, applying a flash for a camera, or other features). In one embodiment, device 600 includes power management 650 that manages battery power usage, charging of the battery, and features related to power saving operation.

Memory subsystem 660 includes memory device(s) 662 for storing information in device 600. Memory subsystem 660 can include nonvolatile (state does not change if power to the memory device is interrupted) and/or volatile (state is indeterminate if power to the memory device is interrupted) memory devices. Memory 660 can store application data, user data, music, photos, documents, or other data, as well as system data (whether long-term or temporary) related to the execution of the applications and functions of system 600. In one embodiment, memory subsystem 660 includes memory controller 664 (which could also be considered part of the control of system 600, and could potentially be considered part of processor 610). Memory controller 664 includes a scheduler to generate and issue commands to memory device 662.

Connectivity 670 includes hardware devices (e.g., wireless and/or wired connectors and communication hardware) and software components (e.g., drivers, protocol stacks) to enable device 600 to communicate with external devices. The external device could be separate devices, such as other computing devices, wireless access points or base stations, as well as peripherals such as headsets, printers, or other devices.

Connectivity 670 can include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 674 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector can allow device 600 to connect to certain peripherals that allow device 600 to control content output, for example, to audiovisual or other systems.

In addition to a proprietary docking connector or other proprietary connection hardware, device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, processor 610 includes AFE 612, which is a frontend circuit in accordance with any embodiment described herein. AFE 612 interfaces processor 610 to multiple sensors (not specifically shown, but could be connected via I/O controller 640). AFE 612 can include voltage mode and/or current mode inputs. In one embodiment, AFE 612 multiplexes inputs from multiple sensors to reduce the amount of analog circuitry needed to implement the frontend. AFE 612 is dynamically configurable, which allows the frontend circuit to adjust its operation and sampling of analog inputs to improve efficiency of operation. AFE 612 includes a preprocessor (not specifically shown) to generate feedback to analog input elements (not specifically shown) to dynamically adjust their operation. Thus, AFE 612 can change operation at runtime to improve the efficiency of the interface with the sensors.

In one aspect, a method for interfacing a digital processor with multiple analog devices, includes: receiving multiple unprocessed analog input signals from multiple different analog devices at a dynamically configurable frontend circuit, the frontend circuit including analog interface components and a preprocessor component; sampling the analog input signals with the frontend circuit, including analyzing the analog input signals with the preprocessor component; and sending control signals from the preprocessor component to the analog interface components based on the analyzing by the preprocessor component to dynamically adjust how the frontend circuit samples the analog input signals.

In one embodiment, receiving multiple analog input signals comprises: receiving at least one voltage mode signal. In one embodiment, receiving multiple analog input signals comprises: receiving at least one current mode signal. In one embodiment, receiving multiple analog input signals comprises: receiving at least one voltage mode signal input and at least one current mode signal input. In one embodiment, analyzing the analog input signals further comprises: determining whether to send a preprocessed input signal to an associated processor, or drop the input signal. In one embodiment, analyzing the analog input signals comprises performing digital filtering. In one embodiment, analyzing the analog input signals comprises performing signal smoothing. In one embodiment, analyzing the analog input signals comprises performing a discrete Fourier transform. In one embodiment, analyzing the analog input signals comprises performing signal feature recognition. In one embodiment, sending the control signals comprises sending an amplifier gain control signal. In one embodiment, sending the control signals comprises sending an amplifier bandwidth control signal. In one embodiment, sending the control signals comprises sending a signal to shut down a portion of an amplifier. In one embodiment, sending the control signals comprises sending an input multiplexer control signal. In one embodiment, sending the control signals comprises sending an analog to digital converter sampling rate control signal. In one embodiment, sending the control signals comprises sending a wake-up signal. In one embodiment, sending the control signals comprises sending a sleep signal. In one embodiment, the method further comprising: multiplexing the multiple analog input signals through a single analog to digital converter.

In one aspect, a frontend circuit for interfacing a digital processor with multiple analog devices includes: multiple analog input hardware interfaces to receive multiple unprocessed analog input signals from multiple different analog devices; analog to digital conversion circuitry to sample the analog input signals; and a signal control and processing block (SCP) to analyze the analog input signals and send control signals to the ADC circuitry based on the analyzing to dynamically adjust how the frontend circuit samples the analog input signals.

In one embodiment, the multiple analog input hardware interfaces include at least one voltage mode signal input. In one embodiment, the multiple analog input hardware interfaces include at least one current mode signal input. In one embodiment, the multiple analog input hardware interfaces include at least one voltage mode signal input and at least one current mode signal input. In one embodiment, the SCP is to analyze the analog input signals including determining whether to send a preprocessed input signal to an associated processor, or drop the input signal. In one embodiment, the SCP is to analyze the analog input signals including performing one or more of digital filtering, signal smoothing, discrete Fourier transform, or signal feature recognition. In one embodiment, the SCP is to send the control signals including sending one or more of an amplifier gain control signal, an amplifier bandwidth control signal, a signal to shut down a portion of an amplifier, an input multiplexer control signal, an analog to digital converter sampling rate control signal, a wake-up signal, or a sleep signal. In one embodiment, the SCP is to send the control signals to cause an input to bypass an amplifier in response to determining with the analyzing that the signal does not need to be amplified. In one embodiment, the frontend circuit further comprising: a multiplexer to multiplex the multiple analog input signals to a single analog to digital converter.

In one aspect, a system with a frontend circuit for interfacing a digital processor with multiple analog devices comprising: a frontend circuit comprising: multiple analog input hardware interfaces to receive multiple unprocessed analog input signals from multiple different analog devices; analog to digital conversion circuitry to sample the analog input signals; and a signal control and processing block (SCP) to analyze the analog input signals and send control signals to the ADC circuitry based on the analyzing to dynamically adjust how the frontend circuit samples the analog input signals; a processor coupled to the frontend circuit to receive analog input signal samples from the frontend circuit; and a high-definition display coupled to a processor that generate a visually-perceptible output based on data received at the frontend circuit.

In one embodiment, the multiple analog input hardware interfaces include at least one voltage mode signal input. In one embodiment, the multiple analog input hardware interfaces include at least one current mode signal input. In one embodiment, the multiple analog input hardware interfaces include at least one voltage mode signal input and at least one current mode signal input. In one embodiment, the SCP is to analyze the analog input signals including determining whether to send a preprocessed input signal to the processor, or drop the input signal. In one embodiment, the SCP is to analyze the analog input signals including performing one or more of digital filtering, signal smoothing, discrete Fourier transform, or signal feature recognition. In one embodiment, the SCP is to send the control signals including sending one or more of an amplifier gain control signal, an amplifier bandwidth control signal, a signal to shut down a portion of an amplifier, an input multiplexer control signal, an analog to digital converter sampling rate control signal, a wake-up signal, or a sleep signal. In one embodiment, the SCP is to send the control signals to cause an input to bypass an amplifier in response to determining with the analyzing that the signal does not need to be amplified. In one embodiment, the frontend circuit further comprising: a multiplexer to multiplex the multiple analog input signals to a single analog to digital converter.

In one aspect, an article of manufacture comprising a computer readable storage medium having content stored thereon, which when executed performs operations for interfacing a digital processor with multiple analog devices, including: receiving multiple unprocessed analog input signals from multiple different analog devices at a dynamically configurable frontend circuit, the frontend circuit including analog interface components and a preprocessor component; sampling the analog input signals with the frontend circuit, including analyzing the analog input signals with the preprocessor component; and sending control signals from the preprocessor component to the analog interface components based on the analyzing by the preprocessor component to dynamically adjust how the frontend circuit samples the analog input signals.

In one embodiment, the content for receiving multiple analog input signals comprises content for receiving at least one voltage mode signal. In one embodiment, the content for receiving multiple analog input signals comprises content for receiving at least one current mode signal. In one embodiment, the content for receiving multiple analog input signals comprises content for receiving at least one voltage mode signal input and at least one current mode signal input. In one embodiment, the content for analyzing the analog input signals further comprises content for determining whether to send a preprocessed input signal to an associated processor, or drop the input signal. In one embodiment, the content for analyzing the analog input signals comprises content for performing one or more of digital filtering, signal smoothing, discrete Fourier transform, or signal feature recognition. In one embodiment, the content for sending the control signals comprises content for sending one or more of an amplifier gain control signal, an amplifier bandwidth control signal, a signal to shut down a portion of an amplifier, an input multiplexer control signal, an analog to digital converter sampling rate control signal, a wake-up signal, or a sleep signal. In one embodiment, further comprising content for multiplexing the multiple analog input signals through a single analog to digital converter.

In one aspect, an apparatus for interfacing a digital processor with multiple analog devices, includes: means for receiving multiple unprocessed analog input signals from multiple different analog devices at a dynamically configurable frontend circuit, the frontend circuit including analog interface components and a preprocessor component; means for sampling the analog input signals with the frontend circuit, including analyzing the analog input signals with the preprocessor component; and means for sending control signals from the preprocessor component to the analog interface components based on the analyzing by the preprocessor component to dynamically adjust how the frontend circuit samples the analog input signals.

In one embodiment, the means for receiving multiple analog input signals comprises: means for receiving at least one voltage mode signal. In one embodiment, the means for receiving multiple analog input signals comprises: means for receiving at least one current mode signal. In one embodiment, the means for receiving multiple analog input signals comprises: means for receiving at least one voltage mode signal input and at least one current mode signal input. In one embodiment, the means for analyzing the analog input signals further comprises: means for determining whether to send a preprocessed input signal to an associated processor, or drop the input signal. In one embodiment, the means for analyzing the analog input signals comprises means for performing one or more of digital filtering, signal smoothing, discrete Fourier transform, or signal feature recognition. In one embodiment, the means for sending the control signals comprises means for sending one or more of an amplifier gain control signal, an amplifier bandwidth control signal, a signal to shut down a portion of an amplifier, an input multiplexer control signal, an analog to digital converter sampling rate control signal, a wake-up signal, or a sleep signal. In one embodiment, further comprising: means for multiplexing the multiple analog input signals through a single analog to digital converter.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for interfacing a digital processor with multiple analog devices, comprising:
sampling data from multiple sensors of different types that provide analog sensor data at a dynamically configurable frontend circuit, the frontend circuit including analog interface components to interface with the multiple sensors, and a preprocessor;
component, the sampling to obtain unprocessed analog input signals from the multiple sensors;
analyzing the sampled analog input signals with the preprocessor component including determining a quality of the analog input signals for the multiple sensors; and
sending control signals from the preprocessor component to the analog interface components based on the analyzing by the preprocessor component to dynamically adjust a configuration of the frontend circuit, including dynamically reconfiguring the frontend circuit with different configuration settings to interface with sensors of different types.

2. The method of claim 1, wherein sampling data from the multiple sensors comprises:
sampling data from at least one sensor that provides a voltage mode signal.

3. The method of claim 1, wherein sampling data from the multiple sensors comprises:
sampling data from at least one current mode sensor that provides a signal.

4. The method of claim 1, wherein analyzing the analog input signals further comprises:
determining whether to send a preprocessed input signal to an associated processor, or drop the input signal.

5. The method of claim 1, further comprising converting the analog input signals into digital signals, and wherein analyzing the analog input signals comprises performing one or more of digital filtering, signal smoothing, discrete Fourier transform, or signal feature recognition on the converted digital signals.

6. The method of claim 1, wherein sending the control signals comprises sending one or more of an amplifier gain control signal, an amplifier bandwidth control signal, a signal to shut down a portion of an amplifier, an input multiplexer control signal, an analog to digital converter sampling rate control signal, a wake-up signal, or a sleep signal.

7. The method of claim 1, further comprising:
multiplexing the multiple analog input signals through a single analog to digital converter.

8. A frontend circuit comprising:
multiple analog input hardware interfaces to receive multiple unprocessed analog input signals from multiple sensors of different types that provide analog sensor data;
analog to digital conversion (ADC) circuitry to sample the analog input signals; and
a signal control and processing block (SCP) to analyze the sampled analog input signals and send control signals to the ADC circuitry responsive to an analysis of the sampled analog input signals to dynamically adjust a configuration of the frontend circuit including dynamically reconfigure the frontend circuit with different configuration settings to interface with sensors of different types.

9. The frontend circuit of claim 8, wherein the multiple analog input hardware interfaces include at least one voltage mode signal input.

10. The frontend circuit of claim 8, wherein the multiple analog input hardware interfaces include at least one current mode signal input.

11. The frontend circuit of claim 8, wherein the SCP is to analyze the sampled analog input signals including to determine whether to send a preprocessed input signal to an associated processor, or drop the input signal.

12. The frontend circuit of claim 8, wherein the SCP is to analyze the sampled analog input signals including to perform one or more of digital filtering, signal smoothing, discrete Fourier transform, or signal feature recognition.

13. The frontend circuit of claim 8, wherein the SCP is to send the control signals including to send one or more of an amplifier gain control signal, an amplifier bandwidth control signal, a signal to shut down a portion of an amplifier, an input multiplexer control signal, an analog to digital converter sampling rate control signal, a wake-up signal, or a sleep signal.

14. The frontend circuit of claim 8, wherein the SCP is to send the control signals to cause an input to bypass an amplifier in response to a determination based on the analysis that the signal does not need to be amplified.

15. The frontend circuit of claim 8, further comprising:
a multiplexer to multiplex the multiple analog input signals to a single analog to digital converter.

16. A system comprising:
a frontend circuit comprising:
- multiple analog input hardware interfaces to receive multiple unprocessed analog input signals from multiple sensors of different types that provide analog sensor data;
- analog to digital conversion (ADC) circuitry to sample the analog input signals; and
- a signal control and processing block (SCP) to analyze the sampled analog input signals and send control signals to the ADC circuitry responsive to an analysis of the sampled analog input signals to dynamically adjust a configuration of the frontend circuit including dynamically reconfigure the frontend circuit with different configuration settings to interface with sensors of different types;

a processor coupled to the frontend circuit to receive analog input signal samples from the frontend circuit; and a high-definition display coupled to a processor that generate a visually-perceptible output based on data received at the frontend circuit.

17. The system of claim 16, wherein the multiple analog input hardware interfaces include at least one voltage mode signal input and at least one current mode signal input.

18. The system of claim 16, wherein the SCP is to analyze the sampled analog input signals including to perform one or more of digital filtering, signal smoothing, discrete Fourier transform, or signal feature recognition.

19. The system of claim 16, wherein the SCP is to send the control signals including to send one or more of an amplifier gain control signal, an amplifier bandwidth control signal, a signal to shut down a portion of an amplifier, an input multiplexer control signal, an analog to digital converter sampling rate control signal, a wake-up signal, or a sleep signal.

20. The system of claim 16, the frontend circuit further comprising:
a multiplexer to multiplex the multiple analog input signals to a single analog to digital converter.

* * * * *